United States Patent
Hoshi

(10) Patent No.: US 7,791,759 B2
(45) Date of Patent: Sep. 7, 2010

(54) IMAGE PROCESSING METHOD AND APPARATUS

(75) Inventor: Nobuhiro Hoshi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1095 days.

(21) Appl. No.: 10/986,944

(22) Filed: Nov. 15, 2004

(65) Prior Publication Data
US 2005/0105114 A1 May 19, 2005

(30) Foreign Application Priority Data
Nov. 18, 2003 (JP) .............................. 2003-387875

(51) Int. Cl.
*G06K 15/00* (2006.01)
*G06T 5/00* (2006.01)

(52) U.S. Cl. ...................... 358/1.9; 358/3.01; 358/3.13; 358/3.27; 358/455; 358/462; 358/448; 345/89

(58) Field of Classification Search .................. 358/1.9, 358/3.01, 3.13, 3.27, 455, 462, 448; 345/89
See application file for complete search history.

(56) References Cited

U.S. PATENT DOCUMENTS

| | | | | |
|---|---|---|---|---|
| 5,268,774 A | * | 12/1993 | Eschbach | 358/466 |
| 5,379,130 A | * | 1/1995 | Wang et al. | 358/462 |
| 6,795,087 B2 | * | 9/2004 | Genba | 345/611 |
| 2001/0043225 A1 | * | 11/2001 | Toffolo | 345/531 |
| 2002/0105491 A1 | * | 8/2002 | Yamaguchi et al. | 345/89 |
| 2002/0196470 A1 | | 12/2002 | Kawamoto et al. | 358/3.06 |
| 2005/0105115 A1 | * | 5/2005 | Hoshi | 358/1.9 |

FOREIGN PATENT DOCUMENTS

| JP | 2000-134471 A | 5/2000 |
|---|---|---|
| JP | 2003-69830 A | 3/2003 |

OTHER PUBLICATIONS

U.S. Appl. No. 10/986,915, filed Nov. 15, 2004.
U.S. Appl. No. 10/987,034, filed Nov. 15, 2004.

* cited by examiner

Primary Examiner—King Y Poon
Assistant Examiner—Quang N Vo
(74) Attorney, Agent, or Firm—Fitzpatrick, Cella, Harper & Scinto

(57) ABSTRACT

An image processing method includes the steps of detecting the dynamic range of input image data, performing edge enhancement processing to increase the number of grayscale levels of the input image data, and performing dithering processing to reduce the number of grayscale levels of each pixel of the input image data. The number of pseudo grayscale levels is determined based on a parameter indicating the level of the dynamic range and a parameter indicating the level of the edge enhancement processing.

2 Claims, 7 Drawing Sheets

FIG. 4

| MODE | EDGE ENHANCEMENT | DYNAMIC RANGE | DITHER (NUMBER OF PSEUDO GRAYSCALE BITS) | DITHER MATRIX | NUMBER OF GRAYSCALE LEVELS + NUMBER OF PSEUDO GRAYSCALE LEVELS (BITS) |
|---|---|---|---|---|---|
| 1 | LOW | NARROW | ON (4) | (a) | 12 |
| 2 | LOW | WIDE | ON (3) | (b) | 11 |
| 3 | HIGH | NARROW | ON (2) | (c) | 10 |
| 4 | HIGH | WIDE | OFF (ROUND) | (d) | 8 |

FIG. 6

| MODE | RESOLUTION CONVERSION | EDGE ENHANCEMENT | DYNAMIC RANGE | DITHER (NUMBER OF PSEUDO GRAYSCALE BITS) | NUMBER OF GRAYSCALE LEVELS + NUMBER OF PSEUDO GRAYSCALE LEVELS (BITS) |
|---|---|---|---|---|---|
| 11 | ENLARGE | LOW | NARROW | ON (4) | 12 |
| 12 | ENLARGE | LOW | WIDE | ON (3) | 11 |
| 13 | ENLARGE | HIGH | NARROW | ON (3) | 11 |
| 14 | ENLARGE | HIGH | WIDE | ON (2) | 10 |
| 15 | REDUCE | LOW | NARROW | ON (2) | 10 |
| 16 | REDUCE | LOW | WIDE | ON (1) | 9 |
| 17 | REDUCE | HIGH | NARROW | ON (1) | 9 |
| 18 | REDUCE | HIGH | WIDE | OFF | 8 |

FIG. 7

| MODE | EDGE ENHANCEMENT | RESOLUTION CONVERSION | DYNAMIC RANGE | DITHER (NUMBER OF PSEUDO GRAYSCALE BITS) | NUMBER OF GRAYSCALE LEVELS + NUMBER OF PSEUDO GRAYSCALE LEVELS (BITS) |
|---|---|---|---|---|---|
| 21 | LOW | ENLARGE | NARROW | ON (4) | 12 |
| 22 | LOW | ENLARGE | WIDE | ON (3) | 11 |
| 23 | LOW | REDUCE | NARROW | ON (3) | 11 |
| 24 | LOW | REDUCE | WIDE | ON (2) | 10 |
| 25 | HIGH | ENLARGE | NARROW | ON (2) | 10 |
| 26 | HIGH | ENLARGE | WIDE | ON (1) | 9 |
| 27 | HIGH | REDUCE | NARROW | ON (1) | 9 |
| 28 | HIGH | REDUCE | WIDE | OFF | 8 |

IMAGE PROCESSING METHOD AND APPARATUS

BACKGROUND OF THE INVENTION

1. Field of the Invention

The present invention relates to image processing methods and apparatuses, and more particularly, to a method for processing digital image signals.

2. Description of the Related Art

Thin display devices, liquid crystal displays (LCDs), plasma displays (PDPs), and field emission displays (FEDs) have attracted attention.

The LCDs, PDPs, and FEDs are fixed-pixel matrix-driven display devices, which can be driven by digital image signals. The number of grayscale levels of the above-described display devices is represented by the number of bits of a video signal corresponding to each pixel.

Techniques for displaying images so that they can be visually aesthetic to the human eye by performing signal processing on image signals are being considered. Such techniques include edge enhancement processing for enhancing edge portions and high-frequency components of images so as to apparently increase the resolution of the images.

FIG. 8 illustrates the configuration of an edge enhancer 800 for performing edge enhancement processing on image signals.

An image signal input from an input terminal 801 is output to a high-pass filter 803 and also to an adder 807.

The high-pass filter 803 extracts high-frequency components of the input image signal and outputs the resulting image signal to a multiplier 805.

Under the control of a controller 809, the multiplier 805 multiplies an enhancement coefficient, indicating the level of enhancement of the high-frequency components of the image, by the high-frequency components, and outputs the resulting signal to the adder 807. By controlling the enhancement coefficient, the level of enhancement of the high-frequency components of the image can be adjusted.

As the bit precision of the high-frequency components which are output from the multiplier 805, an 8-bit image signal input from the input terminal 801 can be increased to a 12-bit image signal by the high-pass filter 803 and by the multiplier 805.

Then, the adder 807 adds the original 8-bit image signal and the 12-bit high-frequency components output from the multiplier 805 and outputs the resulting 12-bit image signal having enhanced high-frequency components to a rounding unit 811.

By outputting an enhancement coefficient having a negative sign from the controller 809, the image can be made smoother instead of enhancing the edges.

To convert the 12-bit image signal into an 8-bit image signal, the rounding unit 811 truncates the lower four bits of the 12-bit image signal by a rounding operation, and outputs the resulting 8-bit image signal to an output terminal 813.

In printers, halftone processing using dithering processing has been performed as a binarizing method. In printers, such as that disclosed in Japanese Patent Laid-Open No. 2000-134471, images are divided into, for example, a character portion and a photograph portion, and different binarizing methods are used for these portions.

Japanese Patent Laid-Open No. 2003-69830 discloses an image processing method for performing resolution conversion and dithering processing.

If, after the number of bits of a pixel signal is increased by performing edge enhancement, the number of bits of the pixel signal is reduced simply by performing the rounding operation, pseudo contours may easily occur depending on the type of image.

In particular, as in natural images, for example, a blue sky, in images having a narrow dynamic range, the correlation of adjacent pixels is high, and pseudo contours easily occur, which is visually noticeable.

To prevent the occurrence of pseudo contours, dithering processing can always be performed instead of the rounding operation. In this case, however, dithering processing does not produce a noticeable effect on images having a wide dynamic range or images subjected to edge enhancement, since pseudo contours do not easily occur because of the low correlation between adjacent pixels of such images. Conversely, dithering processing easily produces an adverse influence, for example, noise having a fixed pattern, which is noticeable.

SUMMARY OF THE INVENTION

Accordingly, it is an object of the present invention to provide an image processing method and apparatus in which high quality images can be displayed while effectively suppressing the occurrence of pseudo contours.

In order to achieve the above-described object, according to one aspect of the present invention, there is provided an image processing method including the steps of: detecting a dynamic range of input image data; performing edge enhancement processing to increase the number of grayscale levels of the input image data; performing dithering processing to reduce the number of grayscale levels of each pixel of the input image data; and determining the number of pseudo grayscale levels in the dithering processing based on a parameter indicating the level of the dynamic range and a parameter indicating the level of the edge enhancement processing.

According to another aspect of the present invention, there is provided an image processing method including the steps of: detecting a dynamic range of input image data; performing edge enhancement processing to increase the number of grayscale levels of the input image data; performing dithering processing to reduce the number of grayscale levels of each pixel of the input image data; and determining the number of pseudo grayscale levels, based on a parameter indicating the level of the dynamic range and a parameter indicating the level of the edge enhancement processing, so that the number of pseudo grayscale levels in the dithering processing is increased when the level of the edge enhancement processing is relatively low or when the level of the dynamic range of the image data is relatively narrow.

According to a further aspect of the present invention, there is provided an image processing apparatus including: a dynamic range detector for detecting a dynamic range of input image data; an edge enhancer for performing edge enhancement processing to increase the number of grayscale levels of the input image data; and a dithering unit for performing dithering processing to reduce the number of grayscale levels of each pixel of the input image data. The number of pseudo grayscale levels in the dithering processing is determined based on a parameter indicating the level of the dynamic range and a parameter indicating the level of the edge enhancement processing.

According to the present invention, the number of pseudo grayscale levels in dithering processing is controlled according to the level of the dynamic range of an input image signal and the level of edge enhancement. It is thus possible to perform signal processing so that high quality images can be displayed while effectively inhibiting pseudo contours.

More specifically, when the level of edge enhancement is relatively low, the number of pseudo grayscale levels in dithering processing is determined to be greater. When the level of the dynamic range of an input image signal is relatively narrow, the number of pseudo grayscale levels in dithering processing is determined to be greater. Accordingly, high quality images can be displayed while effectively inhibiting pseudo contours.

Further objects, features and advantages of the present invention will become apparent from the following description of the preferred embodiments with reference to the attached drawings.

BRIEF DESCRIPTION OF THE DRAWINGS

FIG. 4 illustrates a table indicating the correlation of parameters used in an image processing method according to an embodiment of the present invention.

FIG. 6 illustrates a table indicating an example of the correlation of parameters used in an image processing method according to another embodiment of the present invention.

FIG. 7 illustrates a table indicating another example of the correlation of parameters used in the image processing method according to another embodiment of the present invention.

DESCRIPTION OF THE PREFERRED EMBODIMENTS

The present invention is described in detail below with reference to the accompanying drawings through illustration of preferred embodiments.

First Embodiment

Figure 1:
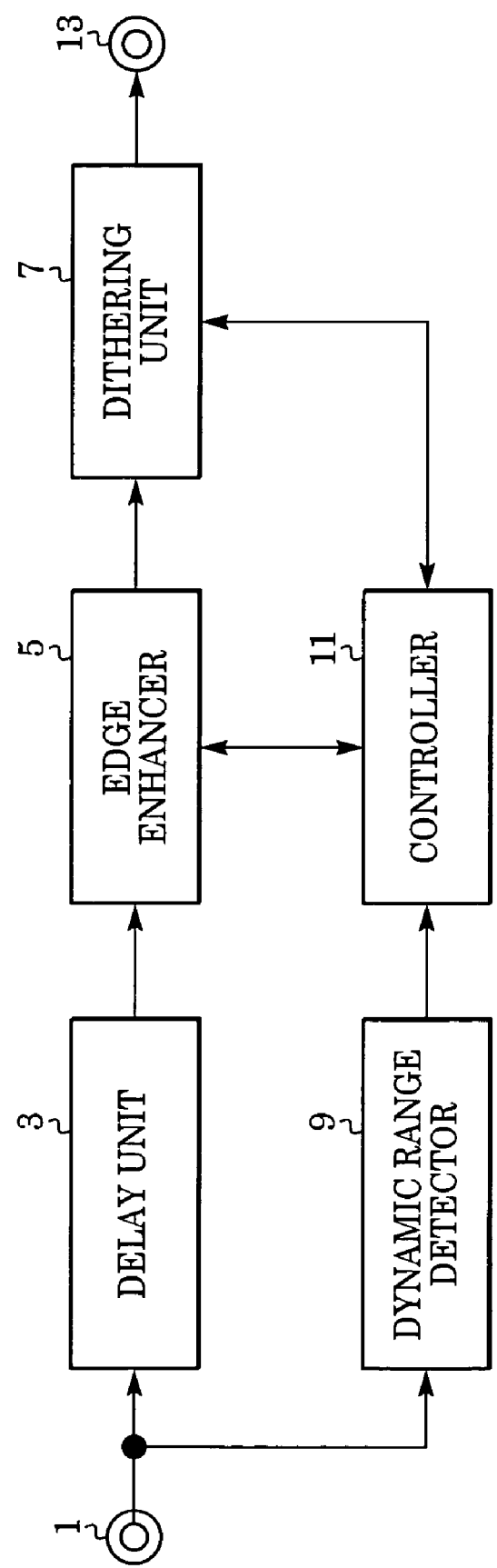
FIG. 1 is a block diagram illustrating an example of a configuration of an image processing apparatus using an image processing method according to an embodiment of the present invention.

Referring to an image processing apparatus shown in FIG. 1, a digital image signal is input into an input terminal 1. In this embodiment, the input digital pixel signal is quantized with eight bits.

The digital image signal input into the input terminal 1 is then output to a delay unit 3 and a dynamic range detector 9.

In the delay unit 3, the digital pixel signal is delayed until the dynamic range of the image signal is detected in the dynamic range detector 9.

The dynamic range of the image signal in the dynamic range detector 9 may be detected as follows. The absolute value of the difference between the maximum value and the minimum value of the pixel signal in one frame of the input image signal is determined. Then, after comparing the determined absolute value with a predetermined threshold, the dynamic range of the image signal is found to be relatively wide or narrow.

The delayed digital image signal is then output to an edge enhancer 5.

The edge enhancer 5 enhances edge portions of the image under the control of a controller 11, and outputs the resulting image to a dithering unit 7. In the edge enhancer 5, in order to maintain the computation precision increased by the edge enhancement, the 8-bit pixel signal is increased to a 12-bit pixel signal. The controller 11 receives a parameter indicating the level of the dynamic range and a parameter indicating the level of edge enhancement as signals, and then determines the number of pseudo grayscale levels in performing dithering processing.

Figures 2, 3A, 3B, 3C, 3D, 3E:
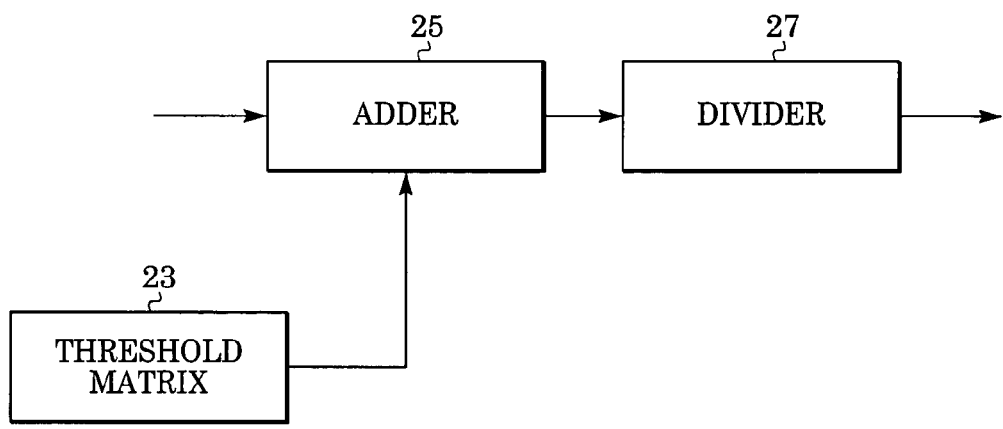
FIG. 2 is a block diagram illustrating the configuration of a dithering unit.
FIGS. 3A through 3E illustrate threshold matrixes used in the dithering unit.

FIG. 2 illustrates the configuration of the dithering unit 7 shown in FIG. 1.

The 12-bit pixel signal output from the edge enhancer 5 shown in FIG. 1 is input into an adder 25 shown in FIG. 2.

Meanwhile, a threshold matrix 23 outputs a threshold matrix indicated by one of FIGS. 3A through 3E to the adder 25 according to the position of the pixel. These threshold matrixes are each formed of a memory or a register, and can be rewritten by the controller 11.

The adder 25 adds the 12-bit pixel image and the threshold of the 4-bit dither matrix, and outputs the added value to a divider 27.

If the most significant bit (MSB) is carried to a higher digit as a result of adding the 12-bit pixel signal and the 4-bit threshold data, the resulting value may be converted into 12 bits by performing clipping before being output to the divider 27.

Clipping replaces the bit length of a pixel signal in excess of a preset maximum value by the maximum value.

The divider 27 divides the input 12-bit pixel signal so as to reduce it into an 8-bit pixel signal, and outputs the resulting signal to an output terminal 13 shown in FIG. 1.

The divider 27 performs a dividing operation by truncating a pixel signal. For example, when the pixel signal output from the adder 25 is a pixel signal clipped to 12 bits, the divider 27 may shift the signal by four bits.

The rounding operation of the pixel signal by using a dither matrix is discussed below.

Only the MSBs of the binary digital data of the matrix are set to 1. That is, if the matrix is a 4-bit threshold matrix, all the columns of the matrix are set to 1000 in binary digital data, i.e., to 8 in decimal notation, as shown in FIG. 3D. The adder 25 adds the 12-bit pixel signal and the threshold of the threshold matrix 23 and outputs the resulting value to the divider 27. Then, in the divider 27, the lower four bits are truncated.

Meanwhile, the dynamic range of the image signal input into the dynamic range detector 9 is detected in units of frames, and the detected level is output to the controller 11.

The controller 11 controls the level of edge enhancement in the edge enhancer 5, and also controls the threshold of the dither matrix in the dithering unit 7 according to the level of the dynamic range output from the dynamic range detector 9 and the level of edge enhancement in the edge enhancer 5.

In the threshold matrix shown in FIG. 3A, the bit length is four bits, and the number of bits which can represent the number of grayscale levels in a pseudo manner is four bits, or 0 to 15 (16 levels). The size of the matrix is 4×4.

In the threshold matrix shown in FIG. 3B, although the bit length is four bits, the least significant bit (LSB) is 0 and the number of bits which can represent the number of grayscale levels in a pseudo manner is 3 bits, i.e., 0, 2, 4, 6, 8, 10, 12, and 14 (8 levels).

In the threshold matrix shown in FIG. 3C, although the bit length is four bits, the lower two bits are 0 and the number of bits which can represent the number of grayscale levels in a pseudo manner is 2 bits, i.e., 0, 4, 8, and 12 (4 levels).

FIG. 4 illustrates a correlation table when the threshold of the dither matrix is controlled according to the level of the dynamic range and the level of edge enhancement. The level of edge enhancement can be changed by increasing or decreasing the coefficient to be multiplied with high-frequency components in the multiplier, as stated above.

In FIG. 4, when the dynamic range of the image signal is narrow and edge enhancement is performed at a low level (mode 1), the resulting image becomes the smoothest, and if bits of the resulting signal are truncated after performing edge enhancement, it is most likely that pseudo contours occur. Thus, in mode 1, the number of pseudo grayscale bits is set to be four, i.e., the dither matrix shown in FIG. 3A is used.

In this case, the number of grayscale levels that can be apparently represented is a total of 12 bits (the number of grayscale levels (8 bits) of the original pixel signal and the number of pseudo grayscale levels (4 bits) by dithering processing).

In FIG. 4, when the dynamic range of the image is wide and edge enhancement is performed at a low level (mode 2), the resulting image becomes the second smoothest, and it is relatively likely that pseudo contours occur. Thus, in mode 2, the number of pseudo grayscale bits is set to be three, i.e., the dither matrix shown in FIG. 3B is used.

In this case, the number of grayscale levels that can be apparently represented is a total of 11 bits (the number of grayscale levels (8 bits) of the original pixel signal and the number of pseudo grayscale levels (3 bits) by dithering processing).

In FIG. 4, when the dynamic range of the image is narrow and edge enhancement is performed at a high level (mode 3), it is relatively unlikely that pseudo contours occur. Thus, in mode 3, the number of pseudo grayscale bits is set to be two, i.e., the dither matrix shown in FIG. 3C is used.

In this case, the number of grayscale levels that can be apparently represented is a total of 10 bits (the number of grayscale levels (8 bits) of the original pixel signal and the number of pseudo grayscale levels (2 bits) by dithering processing).

In FIG. 4, when the dynamic range of the image is wide and edge enhancement is performed at a high level (mode 4), it is least likely that pseudo contours occur, and even if pseudo contours occur, they are unnoticeable. Thus, in mode 4, the image signal is rounded without performing dithering processing.

In this case, the rounding operation may be performed as follows. All the threshold levels in the dither matrix are fixed to 8, as shown in FIG. 3D, and the resulting threshold is added to the 12-bit pixel signal, and then, the lower 4 bits of the resulting value are truncated.

In this case, the number of grayscale levels that can be apparently represented is a total of 8 bits.

The image processing apparatus of this embodiment is connected to a fixed-pixel matrix-driven display device via the output terminal 13, if necessary, through a signal processing circuit or a drive circuit, and the processed image data is supplied to and displayed on the display device.

Second Embodiment

Figure 5:
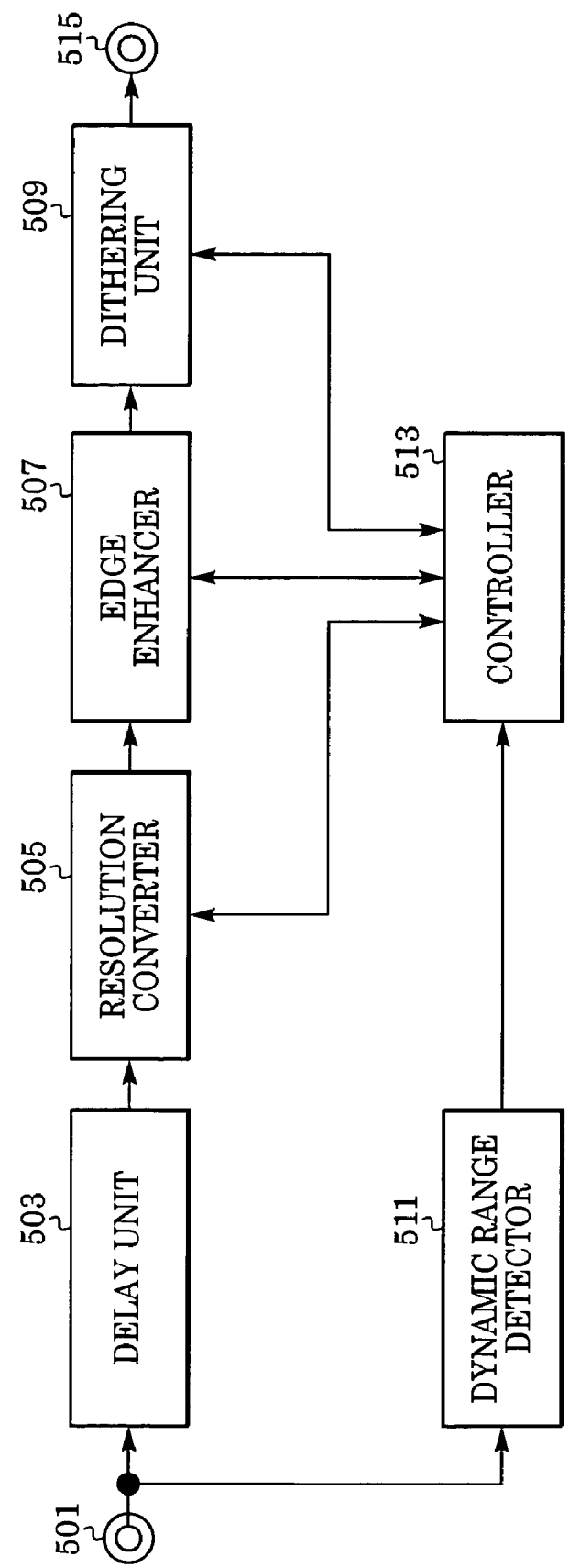
FIG. 5 is a block diagram illustrating another example of the configuration of an image processing apparatus using an image processing method according to another embodiment of the present invention.
Figure 8:
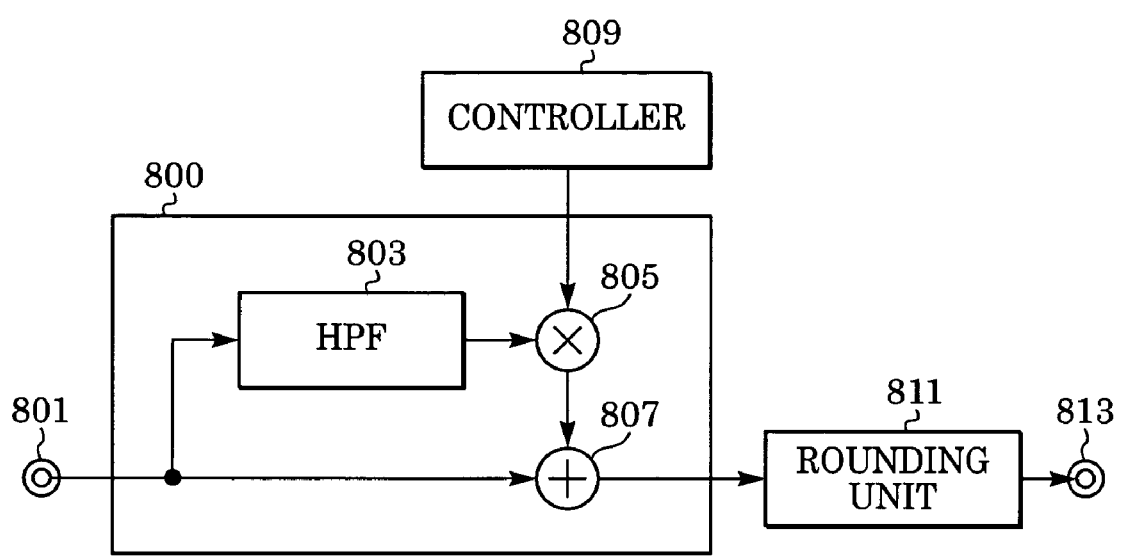
FIG. 8 is a block diagram illustrating an example of a known edge enhancer.

FIG. 5 is a block diagram illustrating another example of a configuration of an image processing apparatus using the image processing method according to another embodiment of the present invention.

A digital image signal is input into an input terminal 501. In this embodiment, an input digital pixel signal is quantized with eight bits.

The digital pixel signal input into the input terminal 501 is output to a delay unit 503 and a dynamic range detector 511.

In the delay unit 503, the digital image signal is delayed until the dynamic range of the image signal is detected in the dynamic range detector 511. For example, to detect the dynamic range of one frame of a television signal, the delay unit 503 delays the television signal by one frame. The delayed digital image signal is output to a resolution converter 505.

The resolution converter 505 converts the resolution of the input signal to the resolution of a display device, such as the number of pixels of a fixed-pixel display device (not shown). That is, by decreasing (reducing) or increasing (enlarging) the number of pixels of an input image signal, the resolution of the input signal is converted into the number of pixels of a display device or the number of pixels of a display area, such as a small window, in the display device. In this specification, the reduction/enlargement ratios are collectively referred to as the "resolution conversion (scaling) ratio".

If, for example, the horizontal resolution and the vertical resolution of the display device are 1280 pixels and 720 pixels, respectively, and if the number of horizontal pixels and the number of vertical pixels of an input image signal are 720 and 480, respectively, the horizontal resolution and the vertical resolution are scaled up by 16/9 and 3/2, respectively.

Although the type of enlargement processing used in the present invention is not restricted, interpolation methods other than the nearest neighbor interpolation, for example, linear interpolation such as bilinear interpolation, or three-dimensional convolutional interpolation such as bicubic interpolation, are preferable.

If, for example, the horizontal resolution and the vertical resolution of the display device are 1280 pixels and 720 pixels, respectively, and if the number of horizontal pixels and the number of vertical pixels of an input image signal are 1920 and 1080, respectively, the horizontal resolution and the vertical resolution are scaled down by 2/3 and 2/3, respectively. In this case, an 8-bit image is expanded into 10 bits.

As reduction processing is used in the present invention, pixel signals can be simply eliminated, or after conducting coordinate transformation by interpolation methods such as linear interpolation or three-dimensional convolutional interpolation, pixel signals at unnecessary coordinates can be eliminated.

An edge enhancer 507 enhances edge portions of the image under the control of a controller 513 and outputs the resulting image to a dithering unit 509. In the edge enhancer 507, in order to maintain the computation precision of the bits increased by edge enhancement, the 10-bit input pixel signal is increased to a 12-bit pixel signal.

Meanwhile, the dynamic range detector 511 detects the dynamic range of one frame of the image signal and outputs the level of the dynamic range to the controller 513.

The controller 513 sets the enlargement/reduction ratios used in the resolution converter 505, and also controls the level of edge enhancement in the edge enhancer 507 so as to control the threshold of a dither matrix in the dithering unit 509 based on the level of the dynamic range input from the dynamic range detector 511, the level of edge enhancement in the edge enhancer 507, and the enlargement or reduction ratio, i.e., the scaling ratio, used in the resolution converter 505.

As the thresholds of the dither matrixes, the same matrixes as those shown in FIGS. 3A through 3E can be used.

Although the bits of the threshold matrix shown in FIG. 3E is four bits, the lower three bits are 0 and the number of bits which can represent the number of grayscale levels in a pseudo manner is 1 bit, i.e., 0 and 8 (2 levels).

FIG. 6 illustrates a correlation table when the threshold of the dither matrix is controlled according to the type of resolution conversion (i.e., enlargement or reduction), the level of the dynamic range, and the level of edge enhancement.

In the correlation table shown in FIG. 6, priority is given to enlargement processing of the resolution conversion over the level of edge enhancement, and pseudo contours are prevented by increasing the number of pseudo grayscale levels by dithering processing.

In FIG. 6, when the dynamic range of the image signal is narrow, when the resolution conversion is enlargement processing, and when edge enhancement is performed at a low level (mode 11), the resulting image becomes the smoothest, and it is most likely that pseudo contours occur. Thus, in mode 11, the number of pseudo grayscale bits represented by dithering is set to be four, i.e., the dither matrix shown in FIG. 3A is used.

In this case, the number of grayscale levels that can be apparently represented are a total of 12 bits (the number of grayscale levels (8 bits) of the original pixel signal and the number of pseudo grayscale levels (4 bits) by dithering processing).

In FIG. 6, when the dynamic range of the image signal is wide, when the resolution conversion is enlargement processing, and when edge enhancement is performed at a low level (mode 12), the resulting image becomes the second smoothest. Thus, in mode 12, the number of pseudo grayscale bits represented by dithering is set to be three, i.e., the dither matrix shown in FIG. 3B is used.

In this case, the number of grayscale levels that can be apparently represented is a total of 11 bits (the number of grayscale levels (8 bits) of the original pixel signal and the number of pseudo grayscale levels (3 bits) by dithering processing).

In FIG. 6, when the dynamic range of the image signal is narrow, when the resolution conversion is reduction processing, and when edge enhancement is performed at a low level (mode 15), pseudo contours easily occur if the dynamic range of the image is an intermediate level.

Thus, in mode 15, the number of pseudo grayscale bits represented by dithering is set to be two, i.e., the dither matrix shown in FIG. 3C is used.

In this case, the number of grayscale levels that can be apparently represented is a total of 10 bits (the number of grayscale levels (8 bits) of the original pixel signal and the number of pseudo grayscale levels (2 bits) by dithering processing).

In FIG. 6, when the dynamic range of the image signal is narrow, when the resolution conversion is reduction processing, and when edge enhancement is performed at a high level (mode 17), it is less likely that pseudo contours occur.

Thus, in mode 17, the number of pseudo grayscale bits represented by dithering is set to be one, i.e., the dither matrix shown in FIG. 3E is used.

In this case, the number of grayscale levels that can be apparently represented is a total of 9 bits (the number of grayscale levels (8 bits) of the original pixel signal and the number of pseudo grayscale level (1 bit) by dithering processing).

In FIG. 6, when the dynamic range of the image signal is wide, when the resolution conversion is reduction processing, and when edge enhancement is performed at a high level (mode 18), it is least likely that pseudo contours occur. Accordingly, the resulting image is truncated without performing dithering processing.

In this case, the rounding operation may be performed as follows. All the threshold levels in the dither matrix are fixed to 8, as shown in FIG. 3D, and the resulting threshold is added to the 12-bit pixel signal, and then, the lower 4 bits of the resulting value are truncated.

In this case, the number of grayscale levels that can be apparently represented is a total of 8 bits.

FIG. 7 illustrates a correlation table in which priority is given to the level of edge enhancement over enlargement/reduction processing of the resolution conversion, and pseudo contours are prevented by increasing the number of pseudo grayscale levels by dithering processing.

In FIG. 7, mode 21 is similar to mode 11 in FIG. 6. Similarly, mode 22, mode 27, and mode 28 are similar to mode 12, mode 17, and mode 18, respectively, in FIG. 6.

In mode 23, however, the number of pseudo grayscale bits represented by dithering processing is greater than that in mode 15 shown in FIG. 6. Likewise, in mode 24, the number of pseudo grayscale bits represented by dithering processing is greater than that in mode 16 shown in FIG. 6. In mode 25, the number of pseudo grayscale bits represented by dithering processing is smaller than that in mode 13 shown in FIG. 6. In mode 26, the number of pseudo grayscale bits represented by dithering processing is smaller than that in mode 14 shown in FIG. 6.

The processing modes in FIG. 6 are preferable when the enlargement/reduction (scaling) ratio of the resolution conversion is large, while the processing modes in FIG. 7 are preferable when the enlargement/reduction (scaling) ratio of the resolution conversion is small.

In FIG. 7, when the edge enhancement is performed at a low level, when the resolution conversion is reduction processing, and when the dynamic range of the image signal is wide (mode 24), pseudo contours likely occur if the dynamic range of the image is an intermediate level.

Thus, in mode 24, the number of pseudo grayscale bits represented by dithering is set to be two, i.e., the dither matrix shown in FIG. 3C is used.

In this case, the number of grayscale levels that can be apparently represented is a total of 10 bits (the number of grayscale levels (8 bits) of the original pixel signal and the number of pseudo grayscale levels (2 bits) by dithering processing).

The image processing apparatus of this embodiment is connected to a fixed-pixel matrix-driven display device via an output terminal 515, if necessary, through a signal processing circuit or a drive circuit, and the processed image data is supplied to and displayed on the display device.

According to the above-described embodiments, a digital pixel signal having real grayscale levels (without pseudo grayscale levels) subjected to image processing is input into a modulation drive circuit of a fixed-pixel matrix-driven display. The digital pixel signal is then subjected to pulse width modulation, voltage amplitude modulation, or current amplitude modulation, or a combination of pulse width modulation and voltage amplitude modulation (or current amplitude modulation). The resulting modulated output signal is then supplied to the corresponding pixel. The luminance of the pixel is exhibited with the real grayscale levels based on the modulated output signal. However, from the point of the entire image of one screen, since the number of pseudo grayscale levels by dithering processing is added to the number of real grayscale levels, the image can be played back and displayed on the basis of a total of the number of real grayscale levels and the number of pseudo grayscale levels.

The present invention can be preferably used in fixed-pixel matrix-driven display devices, for example, electron beam fluorescent displays having pixels consisting of at least one electron beam element and a fluorescent material, such as FEDs and surface conduction displays (SEDs), natural light displays, such as PDPs and electroluminescence displays (ELDs), and displays such as LCDs.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-387875 filed Nov. 18, 2003, which is incorporated herein by reference.

What is claimed is:

1. An image processing method performed by an image processing apparatus that includes a controller, the method comprising the steps of:

detecting a dynamic range of input image data;

performing edge enhancement processing that amplifies high-frequency components of the input image data, where a bit number of grayscale levels of the input image data is increased;

performing dithering processing using one of a plurality of dither matrices respectively having different pseudo-grayscale levels, to reduce the bit number of grayscale levels of each pixel of the image data that has been processed by the edge enhancement processing; and determining the one of the plurality of dither matrices to be used in the dithering processing based on a combination of a parameter indicating a dynamic range of the input image data and a parameter indicating an enhancement coefficient of the edge enhancement processing, wherein the determining is performed, at least in part, by the controller, and wherein the pseudo-grayscale levels of the dither matrix used in the dithering processing is increased when the enhancement coefficient of the edge enhancement processing is relatively low or when the dynamic range of the input image data is relatively narrow, wherein the plurality of dither matrices includes at least four dither matrices respectively having pseudo-grayscale levels A, B, C, and D (A>B>C>D), wherein the dither matrix having pseudo-grayscale level A is determined to be used, in the determining step, when the enhancement coefficient of the edge enhancement processing is relatively low and the dynamic range of the input image data is relatively narrow, wherein the dither matrix having pseudo-grayscale level B is determined to be used, in the determining step, when the enhancement coefficient of the edge enhancement processing is relatively low and the dynamic range of the input image data is relatively wide, wherein the dither matrix having pseudo-grayscale level C is determined to be used, in the determining step, when the enhancement coefficient of the edge enhancement processing is relatively high and the dynamic range of the input image data is relatively narrow, and wherein the dither matrix having pseudo-grayscale level D is determined to be used, in the determining step, when the enhancement coefficient of the edge enhancement processing is relatively high and the dynamic range of the input image data is relatively wide.

2. An image processing apparatus comprising:

a dynamic range detector for detecting a dynamic range of input image data;

an edge enhancer for performing edge enhancement processing that amplifies high-frequency components of the input image data, where a bit number of grayscale levels of the input image data is increased;

a dithering unit for performing dithering processing using one of a plurality of dither matrices respectively having different pseudo-grayscale levels, to reduce the bit number of grayscale levels of each pixel of the image data that has been processed by the edge enhancement processing;

a determining unit for determining the one of the plurality of dither matrices to be used in the dithering processing based on a combination of a parameter indicating a dynamic range of the input image data and a parameter indicating an enhancement coefficient of the edge enhancement processing; and a fixed-pixel matrix-driven display, wherein the input image data subjected to image processing is supplied to and displayed on the fixed-pixel matrix-driven display, wherein the pseudo-grayscale levels of the dither matrix used in the dithering processing is increased when the enhancement coefficient of the edge enhancement processing is relatively low or when the dynamic range of the input image data is relatively narrow, wherein the plurality of dither matrices includes at least four dither matrices respectively having pseudo-grayscale levels A, B, C, and D (A>B>C>D), wherein the determining unit determines that the dither matrix having pseudo-grayscale level A is to be used, when the enhancement coefficient of the edge enhancement processing is relatively low and the dynamic range of the input image data is relatively narrow, wherein the determining unit determines that the dither matrix having pseudo-grayscale level B is to be used, when the enhancement coefficient of the edge enhancement processing is relatively low and the dynamic range of the input image data is relatively wide, wherein the determining unit determines that the dither matrix having pseudo-grayscale level C is to be used, when the enhancement coefficient of the edge enhancement processing is relatively high and the dynamic range of the input image data is relatively narrow, and wherein the determining unit determines that the dither matrix having pseudo-grayscale level D is to be used, when the enhancement coefficient of the edge enhancement processing is relatively high and the dynamic range of the input image data is relatively wide.

* * * * *